Oct. 22, 1968  W. C. MURR  3,406,565
APPARATUS AND METHOD FOR TONOGRAPHY
Filed Sept. 25, 1964  2 Sheets-Sheet 1
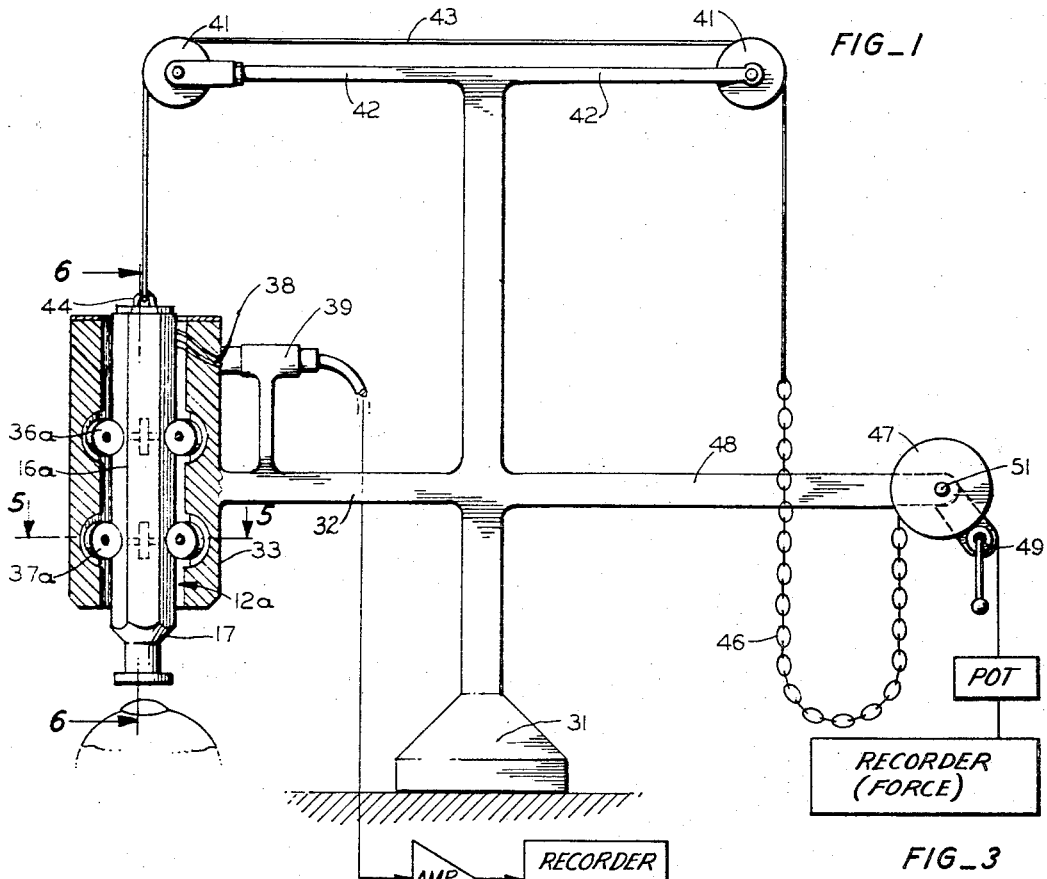
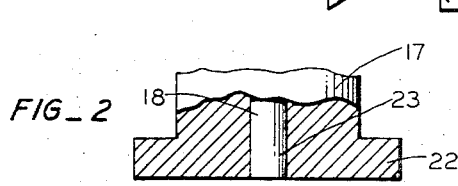
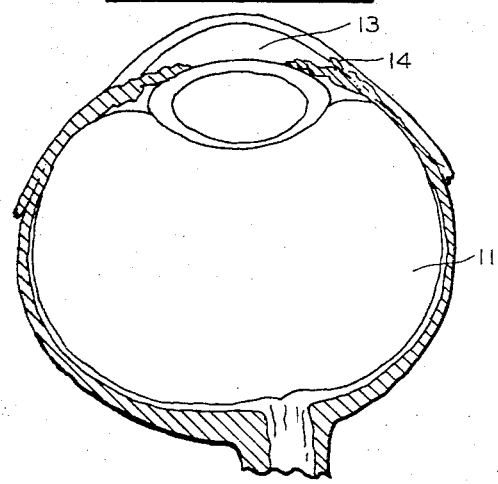
INVENTOR.
WILLIAM C. MURR
BY
Julian Caplan
ATTORNEY

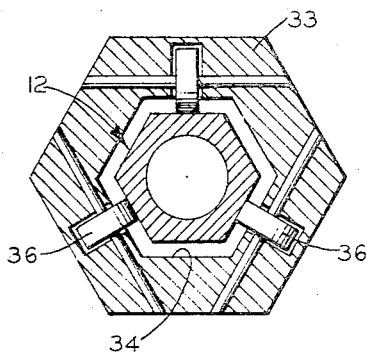
FIG_5
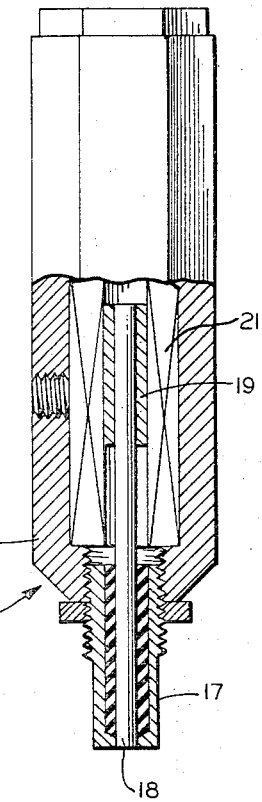
FIG_6
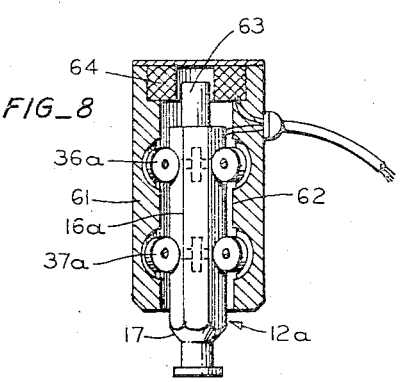
FIG_8
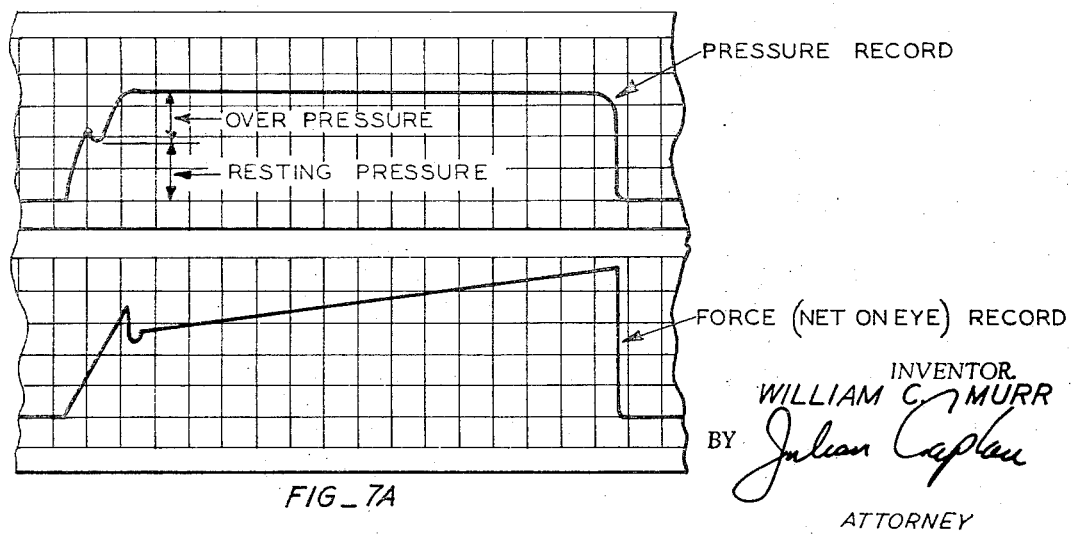
FIG_7
FIG_7A

з,406,565
APPARATUS AND METHOD FOR TONOGRAPHY
William C. Murr, El Sobrante, Calif., assignor to Berkeley
  Tonometer Company, Berkeley, Calif.
Filed Sept. 25, 1964, Ser. No. 399,161
6 Claims. (Cl. 73—80)

ABSTRACT OF THE DISCLOSURE

As an aid in the diagnosis of glaucoma, impedance to expression of fluid from the anterior chamber of the eye is measured. An aplanation tonometer is pressed against the cornea with varying force to maintain the intraocular pressure of the eye, as measured by the tonometer, constant. The resting pressure is recorded and may be compared with normal eye condition recordings for diagnosis. Immediately thereafter the preselected pressure, greater than the resting pressure of the eye, is produced by additional tonometer force on the cornea. The difference, which is apparent on the continuous pressure recording, is the instrumental "over-pressure." This over-pressure is the independent variable which is instrumentally correlated with the measured dependent variable—"force on the eye"—to allow an inference of the relationship over time of a given overpressure with eye volume change. Eye volume is an inferred measure from force on the eye which is the only other apparatus measure besides the pressure. Means is provided for supporting the tonometer and for controlling the force imparted thereto and recording such force.

---

This invention relates to a new and improved apparatus and method for tonography. The human eye has an anterior chamber to which fluid (aqueous humor) is supplied at a varying rate. The fluid filters out of the anterior chamber through a trabecular meshwork into a passage which is called the "canal of Schlemm." Filtration into the canal of Schlemm is sometimes inhibited, either by reason of constriction of the path, or obstruction of some of the exit holes, or for other reasons not fully understood. Accordingly, if the supply of fluid at the input tends to be at a greater rate than the filtering of fluid through the outflow, pressure builds up in the anterior chamber and this is one of the symptoms of glaucoma. A diagnosis of glaucoma is more accurately accomplished by measurement of the impedance to flow of the fluid from the anterior chamber than merely by measuring the pressure in the chamber as is accomplished by tonometry. Measurement of the resistance or impedance is herein termed "tonography."

The method presently used for estimating the impedance has many uncontrolled variables resulting in lost reliability of measurement. The present invention provides means and a method for measurement of the impedance to expression of fluid into and through the exit channels which is reliable. In general, the invention measures the volume of fluid expressed from the eye under controlled circumstances by applying pressure to the eye to, in effect, squeeze fluid from the anterior chamber. In accordance with the present invention, constant pressure is applied to the eye higher than the existing static pressure within the eye at the time of measurement, and at the same time the changing force necessary to maintain this constant pressure is measured over a time interval. By subtracting the final force from the initial force the net change in intraocular volume can be determined by inference. Since, under constant pressure $\Delta F = K \Delta A$, for $$\text{Pressure} = \frac{F \text{ (orce)}}{A \text{ (rea)}} = \frac{F}{A}$$

Under constant pressure $$\frac{F}{A} = K$$

or $$F = KA \quad (1)$$

therefore $$F \Delta F = K(A \div \Delta A) = KA \div K \Delta A \quad (2)$$

$$(2)-(1) \ \Delta F = K \Delta A$$

F is measured and K is set arbitrarily. Therefore, we can infer change in area of a flattened segment of the eye. To a first approximation this is represented by the change in area of the segment of a corneal sphere. The volume of such segment can be calculated from solid geometrical analysis. This volume of fluid has been displaced under known constant over-pressure and gives a measure of impedance to fluid flow uncomplicated by variation in ocular distension. This gives a reading valuable in diagnosis of increased impedance to outflow of fluid.

A further object of the present invention is to provide an instrument which may be conveniently handled by the user to apply the pressure and make the measurements for the purpose described.

A further purpose of the invention is to provide means used in carrying out the method which do not cause serious discomfort to the patient.

A still further advantage of the invention is the fact that the instrument is positive in its action and tendency of the device to "hunt" (overshoot) is resisted.

Other objects of the present invention will become apparent upon reading the following specification and referring to the accompanying drawings in which similar characters of reference represent corresponding parts in each of the several views.

In the drawings:

FIG. 1 is a schematic front elevation of the invention, partly broken away in section.

FIG. 2 is a fragmentary enlarged view showing the device about to be applied to an eyeball.

FIGS. 3 and 4 are fragmentary sectional views of modified devices.

FIG. 5 is an enlarged transverse section taken substantially along line 5—5 of FIG. 1.

FIG. 6 is an enlarged longitudinal sectional view taken along line 6—6 of FIG. 1.

FIG. 7 is a graph showing typical pressure records and net force records in use of the device.

The present invention provides an apparatus for applying to the human eyeball 11 a constant pressure compressive force by means of a tonometer 12, such as the commercially available "Mackay-Marg" tonometer. As shown in FIG. 2, the eyeball 11 has an anterior chamber 13 which is filled with aqueous humor which filters out through the canal of Schlemm 14. The present invention provides apparatus and a method for measuring the impedance to expression of the fluid through said canal 14 as a diagnostic instrument for glaucoma.

A tonometer 12 is an instrument which presently is used to measure the pressure within the eyeball 11 by ophthalmologists and optometrists. Essentially, the instrument has a casing 16, here shown to be hexagonal in cross-section, tapered at its working end 17, and provided with a probe 18 which projects slightly exteriorly and is movable relative to the end 17 of the casing responsive to pressure in the surface against which the instrument is pressed. The probe 18 slides longitudinally within casing 16 and a magnetic armature 19 is attached to the probe adjacent its upper end. Fixed to the casing surrounding magnetic probe 19 is a differential transformer 21. Variation in longitudinal position of probe 18 affects the output of the differential transformer 21 and such output is amplified by electronic equipment and recorded on a tape, all as well understood and commercially practiced in the professions. The present invention uses such a tonometer 12. Various shapes of probe terminii may be used. As shown in FIG. 2, an enlarged, flat circular disc 22 is used and the probe end 23 is disposed centrally of said disc. As shown in FIG. 3, the terminus 26 of the tonometer casing is semi-spheroidal. FIG. 4 shows a conical tip 27 for the casing. It will be understood that other shapes may be used. The criterion of performance is a better force as compared with volume measurement, as well as an easier translation of the force to volume, or both.

Turning now to FIG. 1, it will be seen that a pedestal 31 is provided having a laterally-extending arm 32 provided at its outer end with a hexagonal housing 33 formed with a hexagonal bore 34 larger than the casing 16 of tonometer 12. Sets of top and bottom roller bearings 36, 37 are mounted in the casing, there being a clearance between the exterior of casing 16 and bore 34. Thus, the tonometer may slide vertically within the housing. Provision may be made for loading or side pressure adjustment of one vertical set of roller bearings 34, 36, the other two sets being stationary.

The lead wires 38 from differential transformer 21 are extremely flexible and are received in a fitting 39 on an extension of arm 32. The upper end of stand 31 has a pair of laterally-spaced pulleys 41 on arms 42 over which is a cable 43. One end of cable 43 is fastened by fitting 44 to the upper end of tonometer 12. The other end of cable 43 is attached to chain 46 of materially greater weight per unit of length than cable 43, said chain passing over a drum 47 rotatable on arm 48 of stand 31. Drum 47 may be turned by means of hand crank 49 or other means. By turning drum 47 the length of chain 46 which pulls against the end of cable 43 may be adjusted and hence the counterbalance of the weight of tonometer 12 is likewise adjusted. By turning drum 47 the amount of over-pressure exerted on the eyeball 11 may be adjusted and by proper adjustment said over-pressure may be maintained constant. A potentiometer (not shown) may be affixed to shaft 51 of drum 47 to provide a force measurement which is integrated into the reading of tonometer 12. It will further be understood that instead of the hand crank 49 to obtain a constant pressure, a servomotor (not shown) may be attached which is responsive to variations in pressure, so that the required over-pressure may be maintained constantly.

Turning to FIG. 7, it will be seen that drum 47 is adjusted so that the pressure record is constant after initial pressure rise which is characteristic of tonometers. The normal tonometer reading will show a decline. The net force on the eye is best shown by inference in FIG. 7. Such a record is useful in diagnosis. An alternate apparatus is shown in FIG. 8. The housing 61 is shaped and dimensioned to be held in the hand. Bore 62 of housing 61 is longer than casing 16a which is supported by rollers 36a, 37a, as in the preceding modification. The upper end of the tonometer 12a is provided with a magnetic extension 63 which fits within a solenoid 64 in the upper end of housing 61. An upward force is applied to tonometer 12a by solenoid 64 to partially counterbalance the weight of tonometer 12a, thus producing a controllable net downward force. The means whereby the support is achieved may be either electro-magnetic as described, or pneumatic, hydraulic or mechanical. The end result to be achieved is to provide a controlled support of the floating tonometer 12a and a measurement of the lifting force thereon at each instant. A recording thereof provides a means for diagnosis as has been explained.

In use, the form shown in FIG. 8 is applied to the eye by hand. When the pressure is increased in the eye by the probe pressure to a pre-determined level, the servo system locks on and maintains the tonometer floating vertically in the housing with the proper net force applied.

What is claimed is:

1. An instrument for tonography comprising, a housing, means mounting said housing in fixed position relative to an eye under test, a tonometer having a casing, an apertured tip on said casing, a probe reciprocable in said casing and partially extending through the aperture in said tip for movement toward and away from said eye, said tip when moved toward and into contact with the cornea of said eye compressing said cornea to express fluid from the anterior chamber of said eye through the canal of Schlemm, first recording means for recording the movement of said probe relative to said tip and thereby to record intraocular pressure of said eye, means mounting said casing in said housing for movement of said casing toward and away from said eye, means for applying a variable force to said casing controlling relative movement of said casing and housing, control means under control of the operator for varying said last means and second recording means for recording the position of said control means as a diagnostic aid in measuring impedance to expression of fluid from said anterior chamber.

2. An instrument according to claim 1, in which said control means comprises adjustable means counterbalancing the weight of said tonometer and manual means for increasing and decreasing the effect of said adjustable means.

3. An instrument according to claim 2, which further comprises a potentiometer connected to said control means and said recording means for measuring the position of said control means.

4. An instrument according to claim 1, in which said control means comprises a servo-mechanism for controlling pressure of said tonometer tip against said eye.

5. An instrument according to claim 1, in which said control means comprises a solenoid, an armature connected to said tonometer probe and electrical means controlling energization of said solenoid to vary pressure of said tip on said eye.

6. A method of tonography wherein a tonometer tip is brought into pressure contact with the cornea of an eye by application of variable force on said tip to maintain constant intraocular pressure as a diagnostic aid in measuring impedance to expression of fluid from the anterior chamber of the cornea, said method comprising bringing a tonometer having an apertured tip and a probe reciprocable through the aperture in said tip into pressure contact with an eye, said tip bearing against the cornea and thereby expressing fluid from the anterior of the cornea, measuring the intraocular pressure by relative movement of said tip and probe, applying a variable force on said tip relative to said cornea to maintain said intraocular pressure as thus measured substantially constant, measuring said variable force relative to time, and recording graphically both said intraocular pressure and said variable force.

References Cited

UNITED STATES PATENTS

| | | | |
|---|---|---|---|
| 2,836,173 | 5/1958 | Uemura et al. | 73—80 X |
| 3,049,001 | 8/1962 | Mackey et al. | 73—80 |
| 3,070,997 | 1/1963 | Papritz et al. | 73—80 |
| 3,150,520 | 9/1964 | Mackey et al. | 73—80 |
| 3,184,960 | 5/1965 | Morr et al. | 73—80 |
| 3,272,001 | 9/1966 | Adise | 73—80 |

RICHARD C. QUEISSER, *Primary Examiner.*

C. I. McCLELLAND, *Assistant Examiner.*